US007864640B2

(12) United States Patent
Makino et al.

(10) Patent No.: US 7,864,640 B2
(45) Date of Patent: Jan. 4, 2011

(54) REPRODUCER AND METHOD FOR CONTROLLING REPRODUCTION (75) Inventors: Kenichi Makino, Kanagawa (JP); Yoichiro Sako, Tokyo (JP); Toshiro Terauchi, Tokyo (JP); Makoto Inoue, Kanagawa (JP); Katsuya Shirai, Kanagawa (JP); Yasushi Miyajima, Kanagawa (JP); Motoyuki Takai, Tokyo (JP); Akiko Inoue, Saitama (JP)

(73) Assignee: Sony Corporation, Tokyo (JP)

( * ) Notice: Subject to any disclaimer, the term of this patent is extended or adjusted under 35 U.S.C. 154(b) by 1161 days.

(21) Appl. No.: 10/564,055

(22) PCT Filed: Jul. 14, 2004

(86) PCT No.: PCT/JP2004/010373

§ 371 (c)(1),
(2), (4) Date: Jan. 10, 2006

(87) PCT Pub. No.: WO2005/008668

PCT Pub. Date: Jan. 27, 2005

(65) Prior Publication Data

US 2006/0188109 A1 Aug. 24, 2006

(30) Foreign Application Priority Data

Jul. 18, 2003 (JP) ............... 2003-277131

(51) Int. Cl.
*G11B 20/00* (2006.01)
*H04B 1/00* (2006.01)

(52) U.S. Cl. ............... 369/47.22; 707/1; 707/204; 381/86; 369/27.01

(58) Field of Classification Search ............... 369/47.1, 369/47.22; 84/601; 701/207, 213, 200, 201, 701/204; 715/202; 381/86; 700/94; 705/1.1; 707/1

See application file for complete search history.

(56) References Cited

U.S. PATENT DOCUMENTS

| 7,149,961 | B2 * | 12/2006 | Harville et al. ............... 715/202 |
| 7,227,071 | B2 * | 6/2007 | Tagawa et al. ............... 84/601 |
| 7,650,287 | B2 * | 1/2010 | Abe et al. ............... 705/1.1 |
| 2002/0041692 | A1 * | 4/2002 | Seto et al. ............... 381/86 |
| 2002/0188391 | A1 | 12/2002 | Takahashi et al. | |

FOREIGN PATENT DOCUMENTS

| JP | 10-21259 | 1/1998 |
| JP | 11-242432 | 9/1999 |
| JP | 2000-251382 | 9/2000 |
| JP | 2001-216313 | 8/2001 |
| JP | 2001-265808 | 9/2001 |
| JP | 2001-324335 | 11/2001 |
| JP | 2001-354071 | 12/2001 |
| JP | 2002-351782 | 12/2002 |
| JP | 2002-365062 | 12/2002 |
| JP | 2003-140664 | 5/2003 |

\* cited by examiner

*Primary Examiner*—Peter Vincent Agustin
*Assistant Examiner*—Kim-Kwok Chu
(74) *Attorney, Agent, or Firm*—Oblon, Spivak, McClelland, Maier & Neustadt, L.L.P.

(57) ABSTRACT

Location information obtained from a positioning system 4 and environmental information such as time, temperature, air pressure and the like measured by an environmental information sensor 6 are associated with the reproduction history of music and are recorded in a history storage RAM 14, and music reproduced in the past at the same location as the present location is automatically selected and the music suitable for the location is automatically selected and reproduced based on the location information.

13 Claims, 5 Drawing Sheets

| No | Time | | Longitude | Latitude | Temperature(°C) | Air Pressure(hPa) | Identification ID |
|---|---|---|---|---|---|---|---|
| 1 | 2003/1/10 | 8:52 | Long. 139° 42' 27" E | Lat. 35° 41' 23" N | 4.1 | 1014.5 | 5-2 |
| 2 | 2003/1/10 | 18:14 | Long. 139° 44' 00" E | Lat. 35° 36' 21" N | 5.6 | 1014.2 | 5-7 |
| 3 | 2003/1/11 | 8:47 | Long. 139° 42' 21" E | Lat. 35° 41' 25" N | 4.7 | 995.7 | 5-2 |
| 4 | 2003/1/11 | 18:35 | Long. 139° 44' 03" E | Lat. 35° 36' 17" N | 4.9 | 996.8 | 5-7 |
| ... | | | | | | | |
| m | 2003/5/1 | 8:56 | Long. 130° 23' 43" E | Lat. 35° 35' 09" N | 14.3 | 1014.7 | 12-1 |
| m+1 | 2003/5/3 | 19:49 | Long. 130° 23' 40" E | Lat. 35° 33' 15" N | 16.9 | 1004.7 | 13-3 |

FIG. 4

| No | | Classification | Location | Season | Time | Impression |
|---|---|---|---|---|---|---|
| 1 | S1 | Folk Song | ○○Prefecture | Summer | – | Festival |
| 2 | S2 | Ballard Song | Highlands | Spring | Morning | Fresh |
| 3 | S3 | Popular | Sea | Summer | Afternoon | Encouraging |
| 4 | S4 | Religious Music | Church | – | – | Wedding Ceremony |
| 5 | S5 | New Music | Highway | Autumn | Night | Gentle |
| 6 | S6 | Symphony | Lake | Winter | – | Impressive |
| ... | n | | | | | |

REPRODUCER AND METHOD FOR CONTROLLING REPRODUCTION

TECHNICAL FIELD

The present invention relates to a mobile contents-reproducing apparatus and a method for controlling thereof, and particularly relates to technology that automatically selects and reproduces specific contents.

BACKGROUND ART

As mobile audio reproducing apparatuses, such as a portable audio apparatus and an in-car audio apparatus have been used widely. These apparatuses may have an automatic reproduction mode as well as a typical reproduction mode by which a user selects and reproduces music. As for the automatic reproduction processing, typically random reproduction using random numbers is performed.

Further, lately an apparatus is known in which a navigation apparatus and an audio reproducing apparatus are combined and installed in a vehicle, and a location of the vehicle is measured using a positioning system such as a GPS (Global Positioning System) and the music set by the user in advance is automatically reproduced when having reached a specific place.

The gazette of Published Japanese Patent Application No. 2001-354071 issued by Japanese Patent Office discloses automatic reproduction of specific music at a specific place by a mobile-use audio reproducing apparatus.

However, in the above processing that performs random reproduction, there is a problem that music cannot be selected by the user's intention or in accordance with the situation of the place. Further, in the mobile-use audio reproducing apparatus, since the user needs to explicitly designate the combination of location information and music, there are such problems that only the reproduction set by the user can be performed and the setting is complicated.

The present invention is to automatically select and reproduce contents such as music that is suitable for a certain place, based on location information.

DISCLOSURE OF THE INVENTION

A first aspect of the present invention is a reproducing apparatus including:

a contents data recording medium in which a plurality of contents data are recorded;

environmental variable acquisition means for acquiring environmental variables;

reproduction history storage means for preserving identification information of reproduced contents data combined with the environmental variables at the time of reproduction; and reproduction control means for selecting and reproducing contents data from the contents data recording medium based on similarity between environmental variables at present and the environmental variables stored in the reproduction history storage means.

In this way, since selection and reproduction is performed based on history of the past, contents such as the same music as that time can be reproduced and a user can recollects the memory, when the user again visits the place where the user visited in the past. Further, since information such as music selected by the user remains as the history, contents suited for the user's interest can be selected and reproduced. Furthermore, since there is no need for the user to explicitly designate the place where contents are reproduced and to make complicated settings and the contents can automatically be selected based on the history information of the past and the attribute information of the contents, the user may be free from complicated setting operations.

A second aspect of the present invention is a reproducing apparatus according to the first aspect of the present invention, wherein the environmental variables include at least one of location information, time information and environmental information, positioning means to specify the location is provided when the environmental variables include the location information;

timer means to measure the time is provided when the environmental variables include the time information; and an environmental information sensor to measure the environmental information is provided when the environmental variables include the environmental information.

In this way, contents suitable for the place and time where the user exists is reproduced, and further the contents suitable for the environment can be selected and reproduced.

A third aspect of the present invention is the reproducing apparatus according to the first aspect of the present invention, wherein the environmental variables include at least two of location information, time information and environmental information, and the reproduction control means obtains the similarity with respect to any one of the location information, time information and environmental information among the environmental variables; obtains the similarity with respect to the other information than the one of information when a plurality of similar environmental variables based on the similarity exist; and selects and reproduces the contents data from the contents data recording medium based on this similarity.

In this way, contents having high similarity are appropriately selected and reproduced.

A fourth aspect of the present invention is a reproducing apparatus according to the first aspect of the present invention further including:

attribute information storage means to preserve attribute information of the contents data associated with identification information of the contents data, wherein when it is judged based on the similarity obtained that no environmental variables of the past similar to environmental variables at present exist, the reproduction control means obtains closeness as suitability between the environmental variables at present and the attribute information of the contents data, and selects and reproduces contents data from the contents data recording medium based on the suitability.

In this way, suitable contents can be selected based on the suitability.

A fifth aspect of the present invention is a reproducing apparatus according to the first aspect of the present invention, wherein when it is judged based on the similarity obtained that no environmental variables of the past similar to environmental variables at present exist, the reproduction control means sends the environmental variables at present to a service center, and selects and reproduces contents data from the contents data recording medium based on identification information sent from the service center, and the service center includes: storage means to record attribute information of the contents data associated with identification information of the contents data, and selection control means to select the identification information of the contents data judged to be close to the environmental variables based on suitability between the environmental variables supplied and the attribute information, and to send the identification information to the reproduction control means.

In this way, the suitable contents can be identified by using an outside service center when judgment may not be made from the environmental variables in the reproducing apparatus.

A sixth aspect of the present invention is a reproduction control method including the steps of:

storing identification information of contents data to be reproduced associated with environmental variables at the time of reproduction;

obtaining similarity between environmental variables at present and the stored environmental variables; and selecting and reproducing contents data based on the similarity.

In this way, since selection and reproduction is performed based on the history of the past, contents such as the same music as that time can be reproduced and a user can recollects the memory, when the user again visits the place where the user visited in the past. Further, since information such as music selected by the user remains as the history, contents suited to the user's interest can be selected and reproduced. Furthermore, since there is no need for the user to explicitly designate the place where contents are reproduced and to perform complicated settings and the contents can automatically be selected based on the history information of the past and the attribute information of the contents, the user may be free from complicated setting operations.

A seventh aspect of the present invention is a reproduction control method according to the sixth aspect of the present invention further including the step of:

selecting contents data based on the closeness between environmental variables at present and attribute information of the contents data, when it is judged based on the similarity that no environmental variables of the past similar to environmental variables at present exist.

In this way, the contents most suitable for the situation at a certain place are selected.

An eighth aspect of the present invention is a reproduction control method according to the seventh aspect of the present invention, wherein the similarity obtaining step and/or the selection step is performed at a service center and after the result is received, the contents data is reproduced based on the result.

In this way, the suitable contents can be identified by using the outside service center.

BEST MODE FOR CARRYING OUT THE INVENTION

Figure 1:
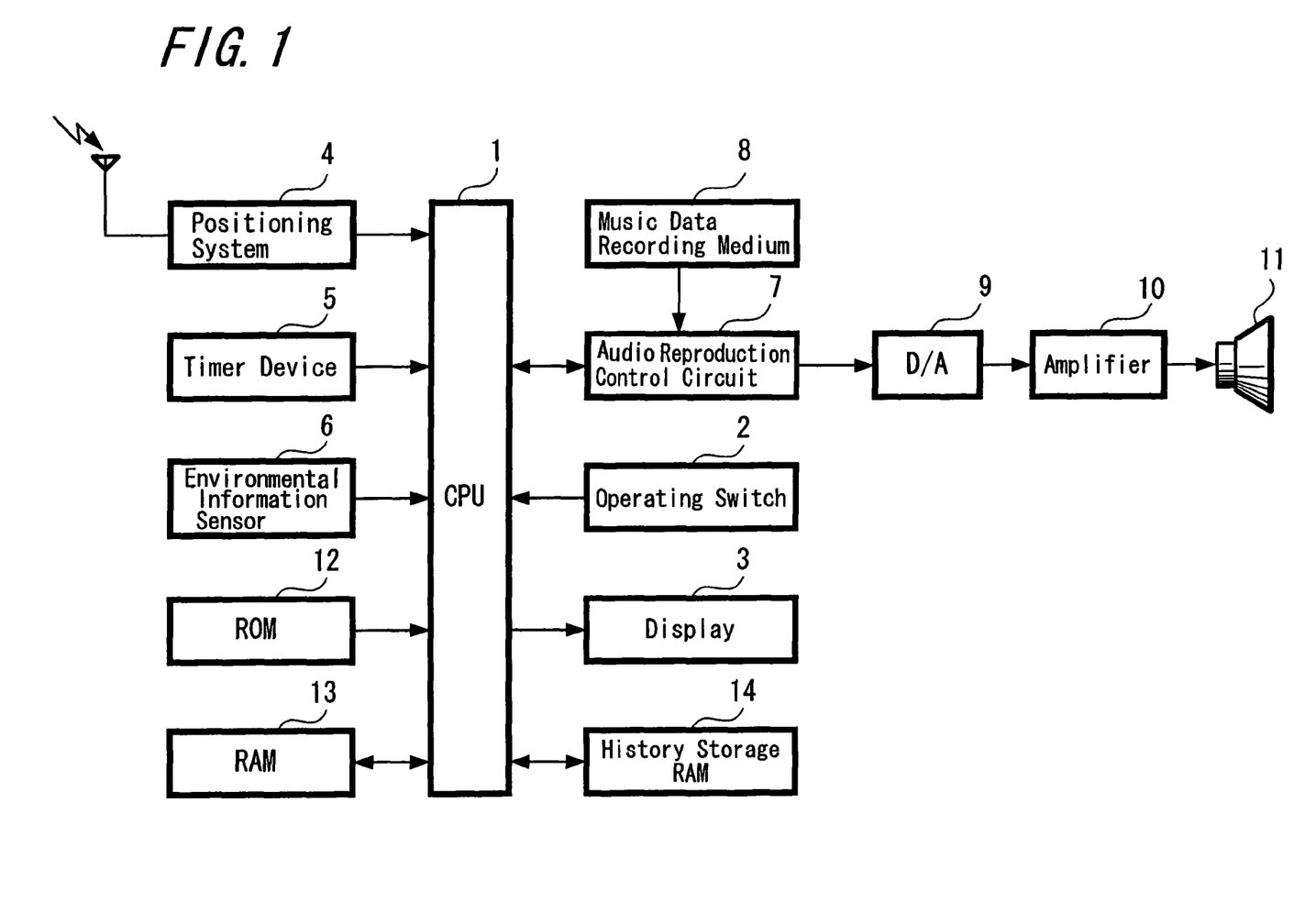
FIG. 1 is a block diagram showing an example of a configuration of a mobile-use audio reproducing apparatus according to the first embodiment of the present invention.
Figure 2:
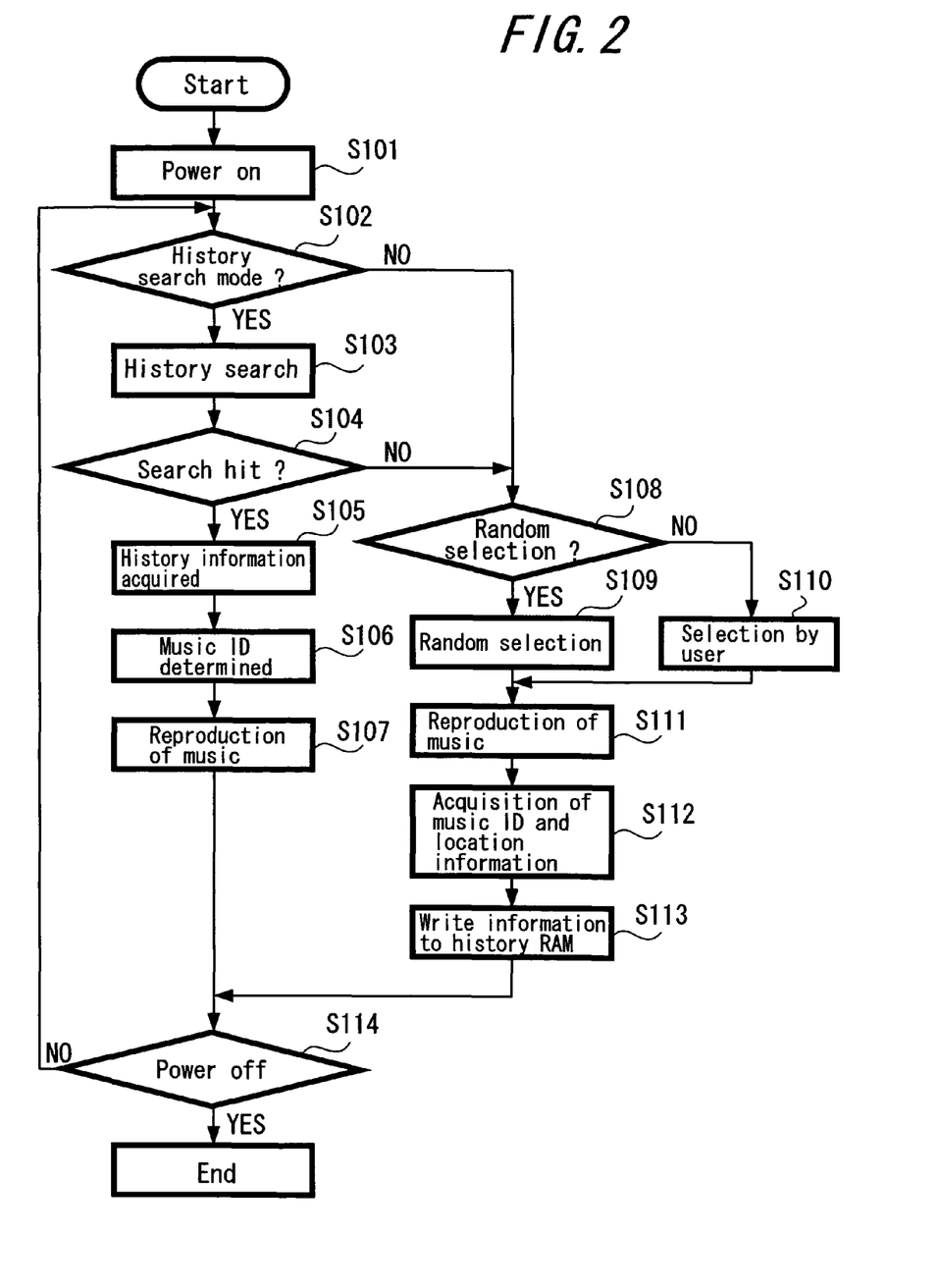
FIG. 2 is a flow chart showing an example of audio reproduction processing according to the first embodiment of the present invention.
Figure 3:
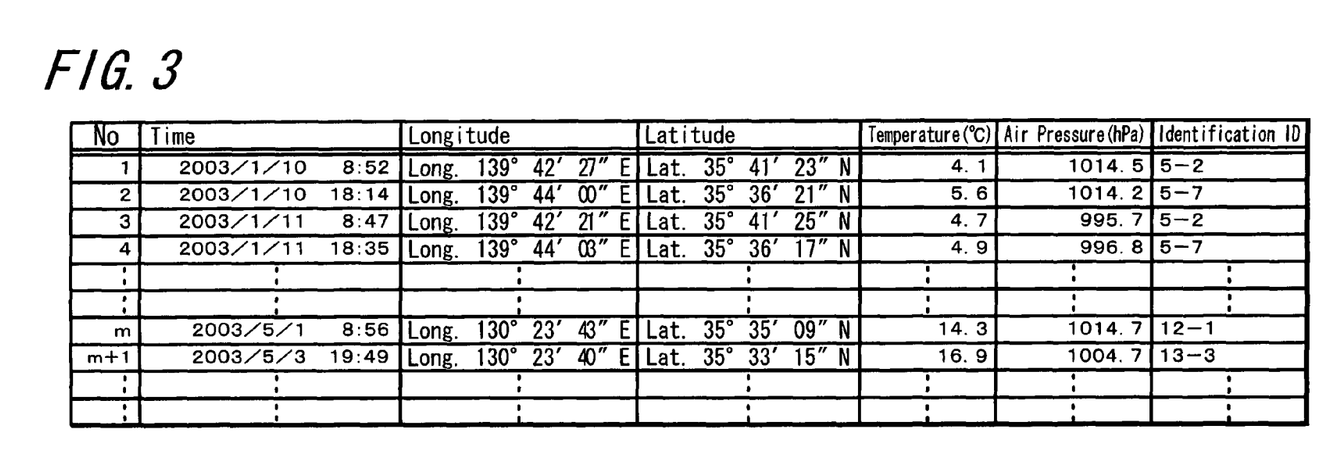
FIG. 3 is an explanatory table showing an example of a data structure of history information according to the first embodiment of the present invention.

Hereinafter, a first embodiment of the present invention is explained by referring to FIGS. 1 to 3.

An example of the configuration of this embodiment is schematically explained with reference to FIG. 1. A CPU (Central Processing Unit) 1 controls each device of this apparatus and an operating switch 2 to operate this apparatus and a display 3 to display information from the CPU 1 are connected to the CPU 1. Further, a positioning system 4 that measures the current location, a timer device 5 that acquires date and time information and an environmental information sensor 6 that measures the environmental information on surroundings are connected to the CPU 1. Further, an audio reproduction control circuit 7 is configured such that specific music is selected from music data recorded in a music data recording medium 8 and is reproduced in accordance with the instruction from the CPU 1. The music reproduced by the audio reproduction control circuit 7 is converted to an analogue signal from a digital signal by a D/A (Digital to analogue) converter 9, and is reproduced from a speaker 11 through an amplifier 10. The program in which processing in the CPU 1 is written is preserved in a ROM (Read Only Memory) 12, and the processing is performed based on information in a RAM (Random Access Memory) 13 that preserves necessary data for the processing of the program and in a history storage RAM 14 which preserves history information of the past.

Here, other positioning systems than the positioning system 4, such as the positioning based on a signal from a base station of a mobile phone system, may also be used as long as coordinates of the current location can be obtained with digital values similarly to the GPS. Further, the environmental information sensor 6 is, for example, a thermometer and a barometer, and only needs to be the one with which from the measured results the situation of the surroundings such as a temperature, air pressure and weather can be obtained. Further, the music data recording medium 8 is the one to which random access is possible, and may be a magnetic disc such as a hard disc, an optical disc such as a CD, a magneto-optical disc such as an MD or the like. Music data is digitized and recorded, and the data may be uncompressed PCM (Pulse Code Modulation) data or may be data compressed by a format such as MP3 (MPEG Audio Layer-3). Furthermore, since it is necessary in this embodiment to reproduce music based on the history of the past, in the case of the hard disc it is desirable to have a sufficient capacity for recording music, and in the case of the CD it is desirable to install an automatic changer that accommodates a plurality of discs.

Further, the audio reproduction control circuit 7 needs to have a function of notifying the CPU 1 of the identification ID to identify the music in performance and a function of extracting and reproducing the music data from the music data recording medium 8 by means of the identification ID notified from the CPU 1. For example, a disc ID and truck number recorded in the CD may be processed as the identification ID in the case of the automatic CD changer.

Next, the processing mainly carried out by the CPU 1 in the case where music is reproduced in this embodiment is explained with reference to a flow chart in FIG. 2. First, the apparatus is started with the power ON (Step 101). Here, a history search mode that searches the history and automatically selects music, a random selection mode that selects music at random and a user selection mode in which music is selected by a user are provided, and the user selects a desired mode from a menu displayed on the operating switch 2 or the display 3 when the user starts this apparatus. Hereupon, with respect to the selection of a mode, although a method of selecting one desired mode, a method of setting an order of priority and the like are conceivable, the case in which the priority is set to the order of the history search mode, random selection mode and user selection mode is here explained. The CPU 1 judges whether the mode set is the history search mode or not (Step 102), and the processing of the history search is carried out if the result was the history search mode.

In the history search processing, at first, from among the history information stored in the history storage RAM 14, data having the most similarity to the current location, date, time, temperature, air pressure and the like is searched (Step 103). A specific method of searching similar data is described later on. Based on the result of the search, whether similar data has been found or not is judged (Step 104) and the history information is acquired if similar data has been found (Step 105), and an identification ID of music is determined (Step 106). The CPU 1 notifies the audio reproduction control circuit 7 of the identification ID of music determined, and the audio reproduction control circuit 7 searches the music data recording medium 8 based on the notified identification ID and extracts corresponding music data to be reproduced (Step 107).

If the mode was not the history search mode at the step 102, or if the similar data did not exist in the history information as the result of the search at the step 104, or if the history information was not being stored, it is judged whether the mode is the random selection mode (Step 108). If the random selection mode has been selected, the CPU 1 performs random selection and determines the identification ID (Step 109).

If the random selection has not been selected at the step 108, selection is made by the user and music that the user desires is input from the operating switch 2 or display 3, (Step 110).

The CPU 1 notifies the audio reproduction control circuit 7 of the identification ID of the music selected at the step 109 or the step 110, and the audio reproduction control circuit 7 searches the music data recording medium 8 based on the notified identification ID and extracts corresponding music data to be reproduced (Step 111). Then, the CPU 1 acquires the identification ID of the music reproduced, location information at present, measured values such as date, time, temperature, air pressure and the like (Step 112) to be written into the history storage RAM 14 (Step 113).

The processing is repeated to reproduce the next music, when the reproduction of music is finished. The processing is ended when the operation of power OFF is performed by the user (Step 114).

Next, the specific method in the step 103 to search data similar to the present data from the history information of the past is explained with reference to FIG. 3. FIG. 3 shows an example of a data structure of the history information stored in the history storage RAM 14. In the history information, environmental variables including environmental information such as time, location (longitudes, latitudes, etc.), temperature, air pressure and the like at the time when the music was reproduced and the identification ID of the music are associated and recorded. In the history search mode, similarity is calculated from the environmental variables at present and the environmental variables recorded in the history information, and the one in which the similarity (similarity distance) is smallest is searched as the similar data. In this description, the closeness between two environmental variables is defined as the similarity and it is judged that the smaller the value is, the more similar the both are.

When similarity to the nth history information is Sn, an expression of the similarity can be defined as the following equation 1, for example. Here, the environmental variables at present are assumed to be m as time (duration from A.D. 2000, for example), x as a longitude, y as a latitude, t as a temperature, and p as an air pressure, and the environmental variables for the nth history information are assumed to be mn, xn, yn, tn and pn, respectively. The W in the equation is weight to each environmental variable, and the wm is weight to a time, the wc is weight to a location, the wt is weight to a temperature, the wp is weight to an air pressure.

$$S_n = W_c \cdot \sqrt{(x-x_n)^2 + (y-y_n)^2} + W_m \cdot |m-m_n| + W_t \cdot |t-t_n| + W_p \cdot |p-p_n| \qquad \text{[Equation 1]}$$

As a result of the calculation using the above equation, the one in which Sn is smallest is judged to be most similar to the present situation, however, in order to avoid selecting one greatly differed from the present situation, only in the case where Sn is within a certain threshold value, the search is made to be successful and in other cases the search is judged to be failure. In addition, in the case where, despite the success of the search, no music data corresponding to the relevant identification ID exists in the music data recording medium 8, the search is judged to be failure. Further, as a result of the search, if two or more pieces of history information whose similarity is within a certain threshold value exist, the music data recording medium 8 may be searched sequentially from the music with the small similarity and the music data first extracted may be processed to reproduce, or two or more pieces of possible information may be displayed on the display 3 and a preferred piece of music may be selected by the user.

Further, in the above example, though similarity concerning time is obtained by the difference between the present time and reproduced time, similarity in the season can be calculated by extracting and comparing a month and day in the time information that represents the year-month-day-hour-minute and similarity in a day of the week can be calculated if a day of the week is obtained from the information of the year-month-day, or similarity in the time zone of a day can be calculated by comparing only the information of the hour and minute. In this way, information to be compared may be selected.

Furthermore, in the above example, though the present value and past value are compared with respect to each of information included in the environment variables, not limited thereto, and the history information most similar may be obtained in stages. Specifically, the weighting coefficients other than the weight wc to the location in the equation 1 are assumed to be all zero and the history information having the location information most similar to the current location is selected. At this time, if there is one piece of similar history information, that information is specified as the similar data, and music data corresponding to the music identification ID recorded into the similar data is selected. If there are two or more pieces of similar history information, the weighting coefficients other than the weight wc to the location and the weight wm to the time are assumed to be all zero, and the history information having the location and time most similar to the current location and time is selected. Further, if there is one piece of similar history information, the information is specified as the similar data and the music data corresponding to the similar data is selected. If there are two or more pieces of similar history information, similarity is calculated by further returning one after another the other weighting coefficients to original values.

In this way, by gradually increasing the weighting coefficient to each of environmental variables when similarity is calculated, possible similar data can be narrowed, and particularly, it is efficient in the case where there is not much history information and in the case where accuracy of similarity calculation is desired to be changed in each stage.

Here, a case in which this embodiment is applied to an in-car audio reproducing apparatus is explained as an example. Assuming that a user drives a car almost every day and listens to music S1 whose identification ID is 5-2 when passing through a point A in the morning and listens to music S2 whose identification ID is 5-7 when passing through a point B in the afternoon, history information is stored as shown in FIG. 3. In this case, only with the user turning on the power of this apparatus and setting the audio reproducing apparatus to the history search mode, the S1 is automatically reproduced when passing through point A in the morning, and the S2 is automatically reproduced when passing through point B in the afternoon. Further, when the user, for example, travels to the place where the user does not visit usually, music data listened to at that place is stored as history information. In this case, the same music as the one listened to in the past is automatically selected and the memory of the past can be recovered, when the user again visits the same place.

Note that, in this embodiment, processing is performed such that by searching history information the most similar music is selected; furthermore, it is also possible to select from the search results the other music than the music selected immediately before. With such processing, the user can enjoy various music pieces.

Figure 4:
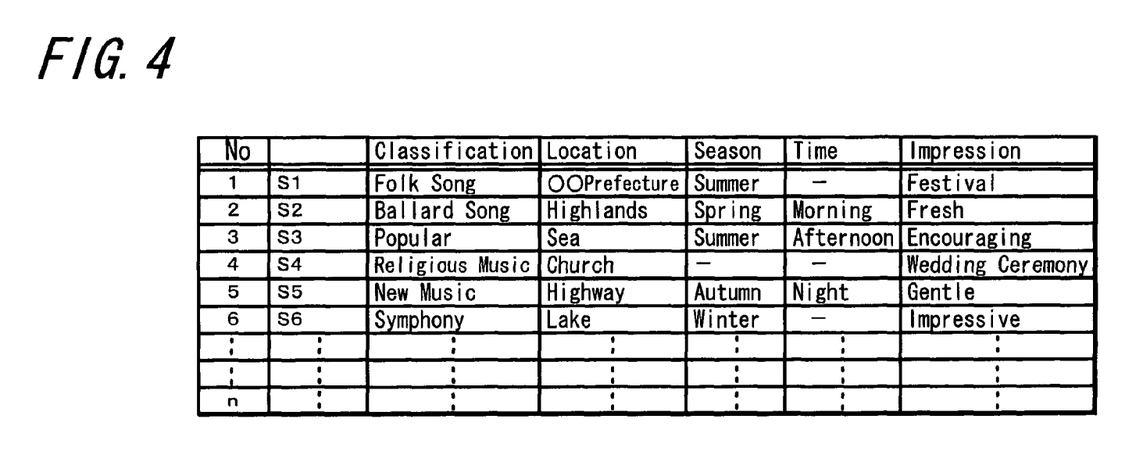
FIG. 4 is an explanatory table showing an example of a data structure of music attribute information according to the second embodiment of the present invention.
Figure 5:
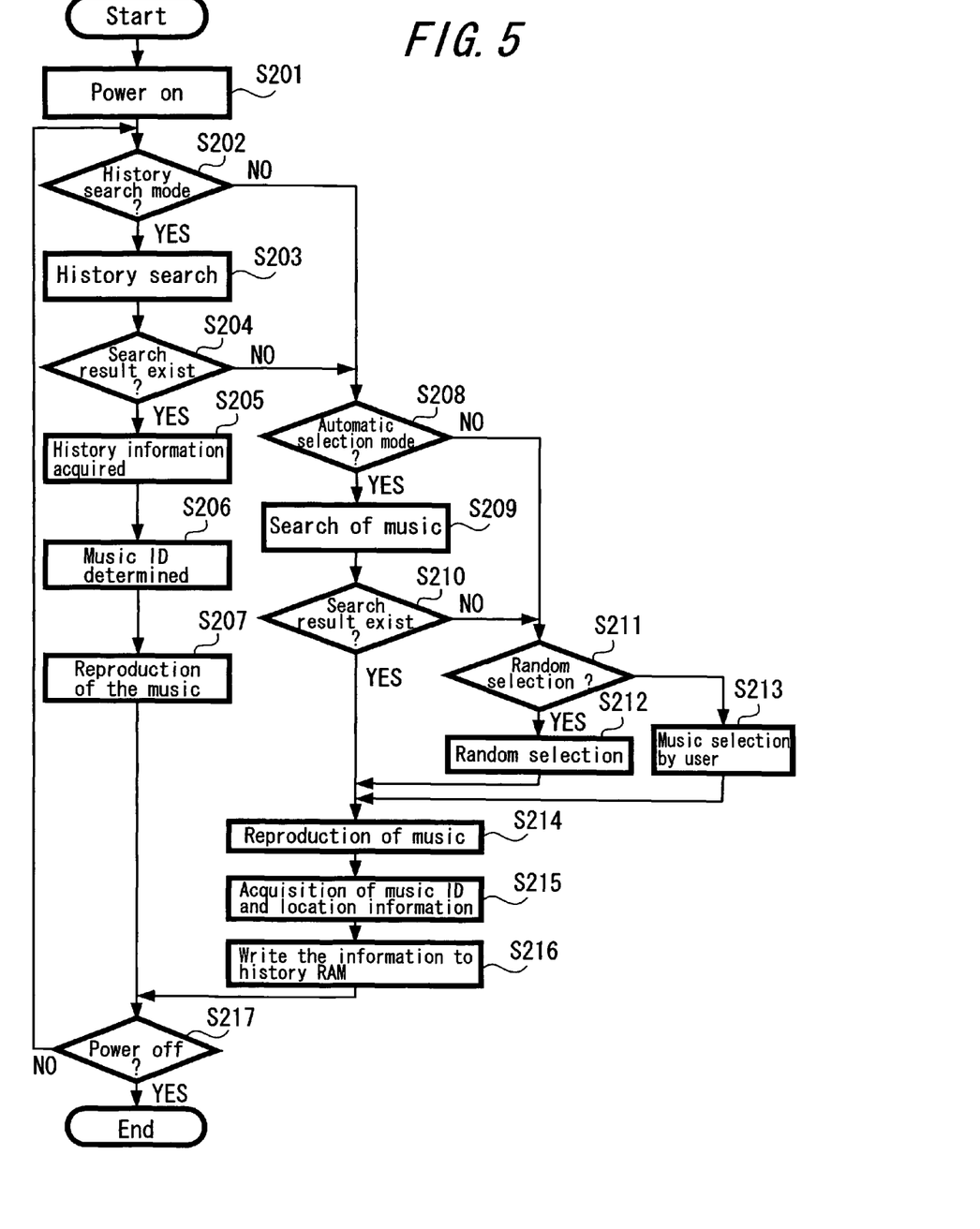
FIG. 5 is a flow chart showing an example of audio reproduction processing according to the second embodiment of the present invention.

Next, the second embodiment of the present invention is explained with reference to FIGS. 4 and 5. This embodiment has the same configuration as that of the apparatus explained in FIG. 1, and as attribute data of music recorded in the music data recording medium 8, the music attribute data shown in FIG. 4 is recorded together with the music data. As the attribute data on the music, such items, other than the title of the music, as classification of the music, a place and address relating to the music, and a season, time, impression received when the user listened to as the impression of the music and so on are defined in advance. Although here an explanation is made in which a provider of the music gives the definition of attribute data, a user may define, add and modify the attribute data.

Processing mainly performed by the CPU 1 in the case that music is reproduced in this embodiment is explained with reference to a flow chart shown in FIG. 5. Since the music reproduction processing from power-ON in the step 201 through the history search mode in the step 207 is the same as that from the step 101 through the step 107 explained in the flow chart of FIG. 2, the explanation thereof is omitted. However, in this embodiment, an automatic selection mode in which a suitable music is automatically selected based on the current location and situation is provided as well as the history search mode, the random search mode and the user selection mode.

If the mode set by the user was not the history search mode at the step 202 or if there was no similar data in the history information as a result of the history search at the step 204, it is judged whether the mode is the automatic selection mode (Step 208). If the automatic selection mode has been selected, the CPU 1 searches the suitable music to the current situation based on the attribute data of the music recorded in the music data recording medium 8 and based on the environmental information such as the current location, temperature, air pressure and so on, and decides the identification ID of the music (Step 209). The specific method of searching the suitable music to the current situation is described later on.

If the mode is not the automatic selection mode at the step 208 or if it is judged that the suitable music is not found at the step 210, it is judged whether the mode is the random selection mode (Step 211). Since the processing of subsequent steps 212 and 213 is the same as the steps 109 and 110 explained in FIG. 1, the explanation thereof is omitted.

With respect to the music searched at the step 209 or the music selected at the steps 212 and 213, the CPU 1 notifies the audio reproduction control circuit 7 of an identification ID of the music, and the audio reproduction control circuit 7 searches the music data recording medium 8 based on the identification ID notified and extracts a corresponding music data and reproduces the music (Step 214). Then the CPU 1 acquires an identification ID of the music reproduced, current location information, the measurement values such as, date, time, temperature, air pressure and so on (Step 215), to be written into the history storage RAM 14 (Step 216). On finishing the reproduction of the music, the processing is repeated to reproduces the next music. If the operation of making the power OFF is done by the user (Step 217), the processing is ended.

Next, a specific method to search a suitable music to the current situation at the step 209 is explained. The information that represents the attribute of the music is being recorded in the music data recording medium 8, as shown in FIG. 4. Since the environmental variables are shown by time, longitude, latitude, temperature, air pressure and so on, the one close to the information defined as the attribute of the music is calculated as suitability and searched based on these environmental variables. For example, as for "location" of the attribute, it is judged using the longitude, latitude of the environmental variables whether there are a place name, building, character of the land, landform and so on that are defined in "location" in the vicinity of the current longitude, latitude, and the distance to that point is used to calculate the suitability. Also, with respect to the "season" and "time", it is judged whether the present date and time coincide with the "season" and "time" that are defined as the attributes, the result of which is used to calculate the suitability.

As described above, the closeness between respective attributes and the environmental variables of the music is represented with a numerical value, and it is defined that a smaller value represents the closeness of the suitability. An expression for calculating the suitability, in which weight is added to each attribute based on the above, can be defined similarly to the equation of the similarity explained above. As a result of the calculation, the one in which the value of the suitability is smallest is judged to be most suitable for the present situation, however, in order to avoid selecting one far from the present situation, only in the case where the suitability is within a certain threshold value, the search is made successful, and the other cases are judged to be failure in search. Hereupon, as a result of the search, if there are two or more pieces of music whose suitability are within the certain threshold value, the music data recording medium 8 is searched sequentially from the music with the smallest suitability, and the processing is made to reproduce the music data first extracted, or a plurality of possible music data may be displayed in the display 3 to be selected by the user as the preferable music.

Further, when setting the search conditions by the user, music to be searched can be narrowed in accordance with the user's preference. For example, when setting the classification and the impression of the music to be selected when the user sets a mode, the music selected in the processes of the history search, automatic selection and random selection can be limited to the "popular song", and the impression of music can also be limited to the one that is "fresh" to be selected.

Note that, in this embodiment, though items such as a music title, classification, location, season, time and impression are explained as the attribute data, other items than the above, in which the characteristics of the music are represented, can also be used. Further, though the explanation was made in which those attributes were recorded together with the music data in a medium such as a hard disc, CD, MD and memory in advance, the user may add and modify the attribute items and that contents.

As explained above, in the first and second embodiments, the CPU 1 is configured to control each device of this apparatus; and as the third embodiment, an explanation is made with respect to a method in which a service center that manages database where the attributes of the music are defined and that has functions of generating possible music data to be selected and has communication means to communicate with the mobile-use audio reproducing apparatus on the user side is provided, and the music selection is performed by the service center.

Figure 6:
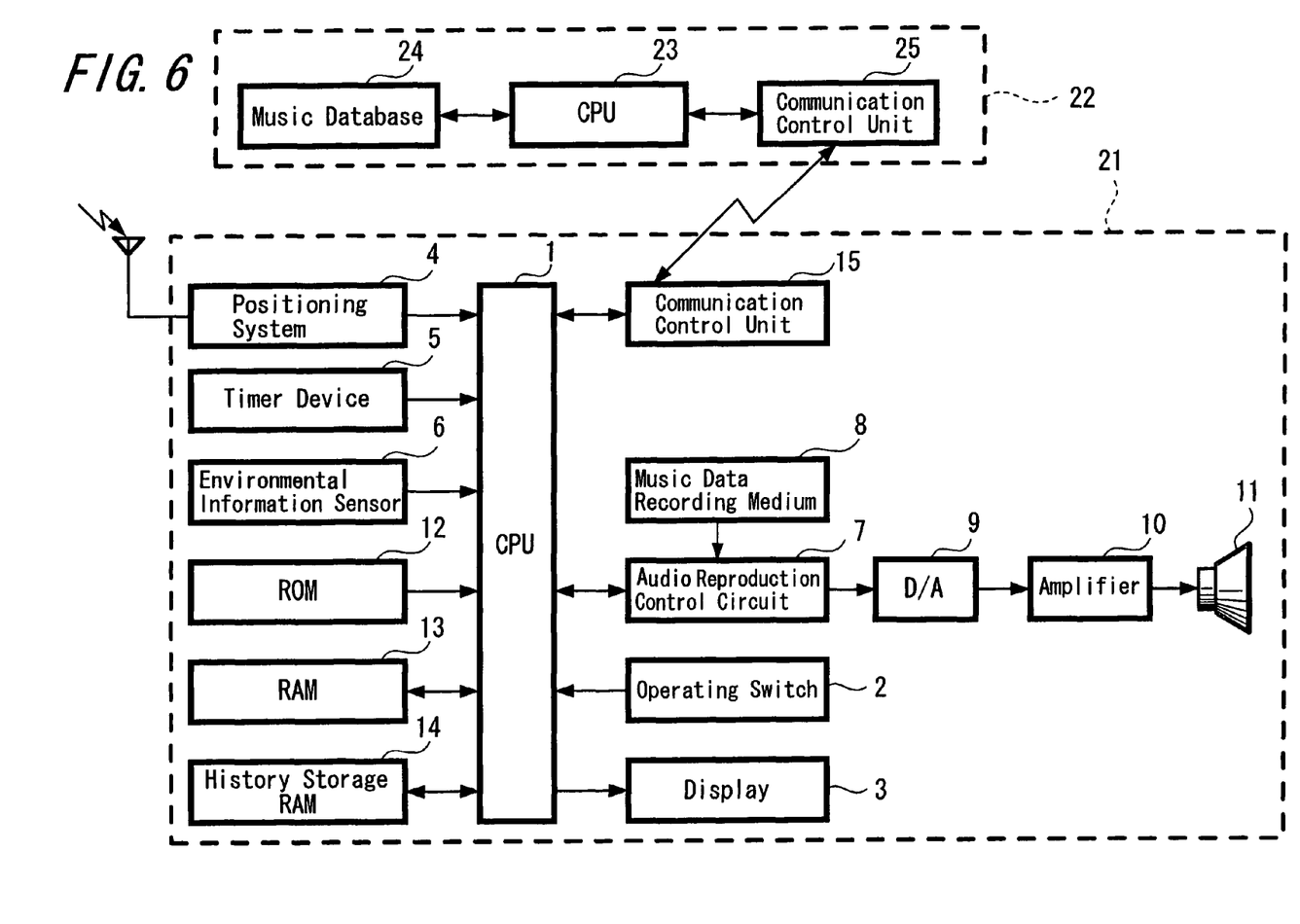
FIG. 6 is a block diagram showing an example of a configuration of a mobile-use audio reproducing apparatus and a service center according to the third embodiment of the present invention.

FIG. 6 is an example of a configuration according to the third embodiment. Here, though the configuration of a mobile-use audio reproducing apparatus 21 has the same configuration as that explained in FIG. 1, a communication control unit 15 for communicating with a service center 22 is connected to the CPU 1. On the other hand, the service center 22 includes a CPU 23, a music database 24 and a communication unit 25. Here, the music database 24 is the database that defines the identification ID and attribute of the music, and is being preserved in the recording medium such as a magnetic disc and RAM.

The music selection processing according to this embodiment is explained. Although the whole of the processing flow is similar to the flow chart of FIG. 5, the music search at the steps 209 and 210 is performed in the service center 22, which is different from the previous embodiment. The mobile-use audio reproducing apparatus 21 transmits environmental variables such as the current location, current time, temperature, air pressure, and so on to the service center 22 through the communication control unit 15. The service center 22 receives information sent from the mobile-use audio reproducing apparatus 21 by the communication control unit 25 to be supplied to the CPU 23. In the CPU 23, the possible music data suitable for the present situation is extracted referring to the music attribute data in the music database 24 based on the acquired environmental variables, and the identification ID of the music is returned to the mobile-use audio reproducing apparatus 21 of the user from the communication control unit 25 as the possible music list. In the mobile-use audio reproducing apparatus 21, the possible music list returned is received by the communication control unit 15; and the CPU 1 extracts the list to search the music in the possible music list out of the music data recording medium 8 and reproduction thereof is performed.

Note that, in this embodiment, the music database 24 in the service center 22 was explained in which the attributes of the music were made to be the database; the database may be the one explained in the first embodiment in which history information of the past of the user is preserved. The mobile-use audio reproducing apparatus 21 on the user side transmits to the service center 22 the history information such as the reproduced music and environmental information at each time when reproduction of music is performed or at the end of the processing collectively such as when the power is OFF. In the service center 22, the history information transmitted thereto is classified for each user who receives the service and is preserved in the database. With such a configuration, the history search processing in the history search mode on the user side is performed by the CPU 23 in the service center 22, and the search result can be returned to the mobile-use audio reproducing apparatus 21.

In this way, according to the third embodiment, since the processing performed in the CPU 1 of the mobile-use audio reproducing apparatus 21 is reduced and the amount of information recorded in the music data recording medium 8 and the history storage RAM 14 is made small, the recording medium having small capacity can be used. Furthermore, since the history search processing for selecting the music and the search of the music suitable for the present situation and the like are performed by the CPU 23 in the service center 22, maintenance and functional reinforcement to the program describing the contents of processing are carried out with ease, consequently the music that satisfies the user can be obtained.

Note that, in the above-described first, second and third embodiments, though explanation is made with respect to an example in which the present invention is applied to an in-car audio reproducing apparatus, however not limited thereto, the present invention can be applied to the other movable audio reproducing apparatus and so on. Further, in the above embodiments, explanation is made about the reproduction of music, however, the present invention can be applied when data other than the music is used, for example: audio data such as narration; text data such as messages; selection and reproduction of the video program; and so on. Furthermore, in each of the embodiments described above, although an apparatus constituted as a reproducing apparatus that performs the processing of this invention was used, the program that executes the processing of this invention is installed in, for example, a personal computer apparatus, a card or the like for the positioning is connected thereto, and music and video stored in the computer apparatus is selected and reproduced based on the data of the past and the positioning data at present.

DESCRIPTION OF REFERENCE NUMERALS

1 . . . CPU
2 . . . OPERATING SWITCH
3 . . . DISPLAY
4 . . . POSITIONING SYSTEM
5 . . . TIMER DEVICE
6 . . . ENVIRONMENTAL INFORMATION SENSOR
7 . . . AUDIO REPRODUCTION CONTROL CIRCUIT
8 . . . MUSIC DATA RECORDING MEDIUM
9 . . . D/A CONVERTER
10 . . . AMPLIFIER
11 . . . SPEAKER
12 . . . ROM
13 . . . RAM
14 . . . HISTORY STORAGE RAM
15 . . . COMMUNICATION CONTROL UNIT
21 . . . MOBILE-USE AUDIO REPRODUCING APPARATUS
22 . . . SERVICE CENTER
23 . . . CPU
24 . . . MUSIC DATABASE
25 . . . COMMUNICATION CONTROL UNIT OPERATING SYSTEM

The invention claimed is:

1. A reproducing apparatus, comprising:
a contents data recording medium in which a plurality of contents data are recorded;
environmental variable acquisition means for acquiring environmental variables;
reproduction history storage means for combining and storing identification information of reproduced contents data, reproduced by the reproducing apparatus, with the acquired environmental variables at a time of reproduction; and
reproduction control means for calculating a similarity value between acquired environmental variables at present and acquired environmental variables stored in said reproduction history storage means for each of the plurality of contents data, and for selecting and reproducing contents data whose similarity value is judged by the reproduction control means to be closest to a predetermined threshold, wherein the reproduction control means calculates the similarity value based on the equation:

$$S_n = W_c \cdot \sqrt{(x-x_n)^2 + (y-y_n)^2} + W_m \cdot |m-m_n| + W_t \cdot |t-t_n| + W_p \cdot |p-p_n|$$

where $S_n$ is the calculated similarity value, $W_c$ is a weight factor of location, x is a present longitude, $x_n$ is nth history of longitude, y is a present latitude, $y_n$ is nth history of latitude, $W_m$ is a weight factor of time, m is a current time, $m_n$ is nth history of time, $W_t$ is a weight factor of temperature, t is a current temperature, $t_n$ is nth history of temperature, $W_p$ is a weight factor of pressure, p is a current pressure, and $p_n$ is nth history of pressure.

2. The reproducing apparatus according to claim 1, wherein said acquired environmental variables include at least one of location information, time information and acquired environmental variables, the reproducing apparatus, further comprising:
positioning means to specify the location is provided when said acquired environmental variables include location information;
timer means to measure the time is provided when said acquired environmental variables include time information; and
an environmental information sensor to measure the environmental information is provided when said acquired environmental variables include environmental information.

3. The reproducing apparatus according to claim 1, wherein said acquired environmental variables include at least two of location information, time information and environmental information, said reproduction control means obtains said similarity value with respect to any one of location information, time information and environmental information of said acquired environmental variables, obtains said similarity value with respect to the other information than said one of information when a plurality of similar acquired environmental variables based on this similarity value exist; and selects and reproduces the contents data from said contents data recording medium based on this similarity value.

4. The reproducing apparatus according to claim 1, further comprising:
attribute information storage means to preserve attribute information of said contents data associated with identification information of said contents data,
wherein when it is judged based on said similarity value obtained that no acquired environmental variables of the past similar to acquired environmental variables at present exist, said reproduction control means obtains a closeness value as a measure of suitability between acquired environmental variables at present and the attribute information of said contents data, and selects and reproduces the contents data from said contents data recording medium based on the measure of suitability.

5. The reproducing apparatus according to claim 1, further comprising:
communication control means for transmitting acquired environmental variables at present to a remote service center when it is judged based on said similarity value that no acquired environmental variables of the past similar to acquired environmental variables at present exist, and for receiving identification information from the remote service center,
wherein the reproduction control means selects and reproduces the contents data from said contents data recording medium based on the identification information received from the service center, and
said service center includes
storage means to record said attribute information of the contents data associated with the identification information of the contents data, and
selection control means to select the identification information of the contents data judged to be close to the acquired environmental variables based on suitability between the acquired environmental variables supplied and said attribute information, and to transmit the identification information to said communication control means.

6. A reproduction control method, comprising:
storing and associating identification information of contents data to be reproduced with environmental variables at a time of reproduction, the contents data being recorded on a recording medium and the environmental variables being acquired by an acquisition means;
calculating a similarity value between acquired environmental variables at present and the stored acquired environmental variables;
selecting and reproducing contents data whose calculated similarity value is closest to a predetermined threshold and
calculating the similarity value based on the equation:

$$S_n = W_c \cdot \sqrt{(x-x_n)^2 + (y-y_n)^2} + W_m \cdot |m-m_n| + W_t \cdot |t-t_n| + W_p \cdot |p-p_n|$$

where $S_n$ is the calculated similarity value, $W_e$ is a weight factor of location, x is a present longitude, $x_n$ is nth history of longitude, y is a present latitude, $y_n$, is nth history of latitude, $W_m$ is a weight factor of time, m is a current time, $m_n$ is nth history of time, $W_t$ is a weight factor of temperature, t is a current temperature, $t_n$ is nth history of temperature, $W_p$ is a weight factor of pressure, p is a current pressure, and $p_n$, is nth history of pressure.

7. The reproduction control method according to claim 6, further comprising:
selecting contents data based on a closeness between acquired environmental variables at present and attribute information of the contents data, when it is judged based on said similarity value that no acquired environmental variables of the past similar to environmental variables at present exist.

8. The reproduction control method according to claim 7, further comprising:
transmitting the acquired environmental variables at present to a remote service center;

selecting at the remote service center contents data to be reproduced; and reproducing the selected contents data to be reproduced.

9. A reproducing apparatus, comprising:
a contents data recording medium in which a plurality of contents data are recorded;
an environmental data acquisition unit configured to acquire environmental data;
a storage unit configured to combine and to store identification information of reproduced contents data, reproduced by the reproducing apparatus, with the acquired environmental data at a time of reproduction; and
a controller configured to calculate a similarity value between acquired environmental data at present and acquired environmental data stored in the storage unit for each of the plurality of contents data, and to select and reproduce contents data whose similarity value is judged by the controller to be closest to a predetermined threshold, wherein the controller calculates the similarity value based on the equation:

$$S_n = W_c \cdot \sqrt{(x-x_n)^2 + (y-y_n)^2} + W_m \cdot |m-m_n| + W_t \cdot |t-t_n| + W_p \cdot |p-p_n|$$

where $S_n$ is the calculated similarity value, $W_c$ is a weight factor of location, x is a present longitude, $x_n$ is nth history of longitude, y is a present latitude, $y_n$ is nth history of latitude, $W_m$ is a weight factor of time, m is a current time, $m_n$ is nth history of time, $W_t$ is a weight factor of temperature, t is a current temperature, $t_n$ is nth history of temperature, $W_p$ is a weight factor of pressure, p is a current pressure, and $p_n$ is nth history of pressure.

10. The reproducing apparatus according to claim 9, wherein said acquired environmental data includes at least one of location information, time information and environmental information, the reproducing apparatus, further comprising:
a positioning unit configured to obtain the location is provided when said acquired environmental data include location information;
a timer configured to measure the time is provided when said environmental data include time information; and
an environmental information sensor configured to measure the environmental information is provided when said acquired environmental data include environmental information.

11. The reproducing apparatus according to claim 9, wherein said acquired environmental data includes at least two of location information, time information and environmental information, said controller obtains said similarity value with respect to any one of location information, time information and environmental information of said acquired environmental data,
obtains said similarity value with respect to the other information than said one of information when a plurality of similar acquired environmental data based on this similarity value exists; and selects and reproduces the contents data from said contents data recording medium based on this similarity value.

12. The reproducing apparatus according to claim 9, further comprising:
an attribute information storage unit configured to store attribute information of said contents data associated with identification information of said contents data,
wherein when it is judged based on said similarity value obtained that no acquired environmental data of the past similar to acquired environmental data at present exist, said controller obtains a closeness value as a measure of suitability between acquired environmental data at present and the attribute information of said contents data, and selects and reproduces the contents data from said contents data recording medium based on the measure of suitability.

13. The reproducing apparatus according to claim 9, further comprising:
a communication controller configured to transmit acquired environmental data at present to a remote service center when it is judged based on said similarity value that no acquired environmental data of the past similar to environmental data at present exist, and to receive identification information from the remote service center,
wherein the controller selects and reproduces the contents data from said contents data recording medium based on the identification information received from the service center, and
said service center includes
a storage unit configured to record said attribute information of the contents data associated with the identification information of the contents data, and
a selection controller configured to select the identification information of the contents data judged to be close to the acquired environmental data based on suitability between the acquired environmental data supplied and said attribute information, and to transmit the identification information to said controller.

* * * * *